Patented Aug. 9, 1932

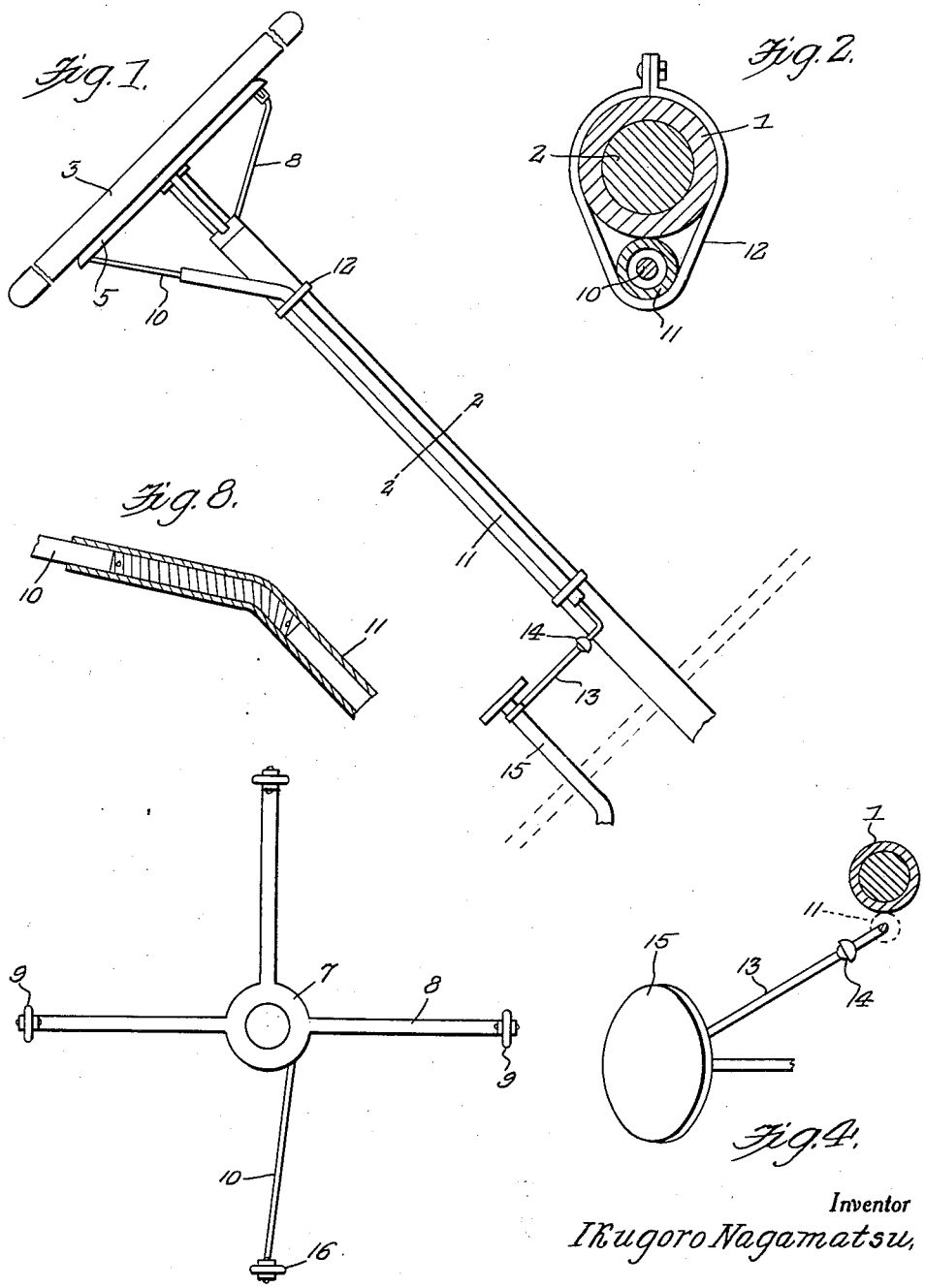

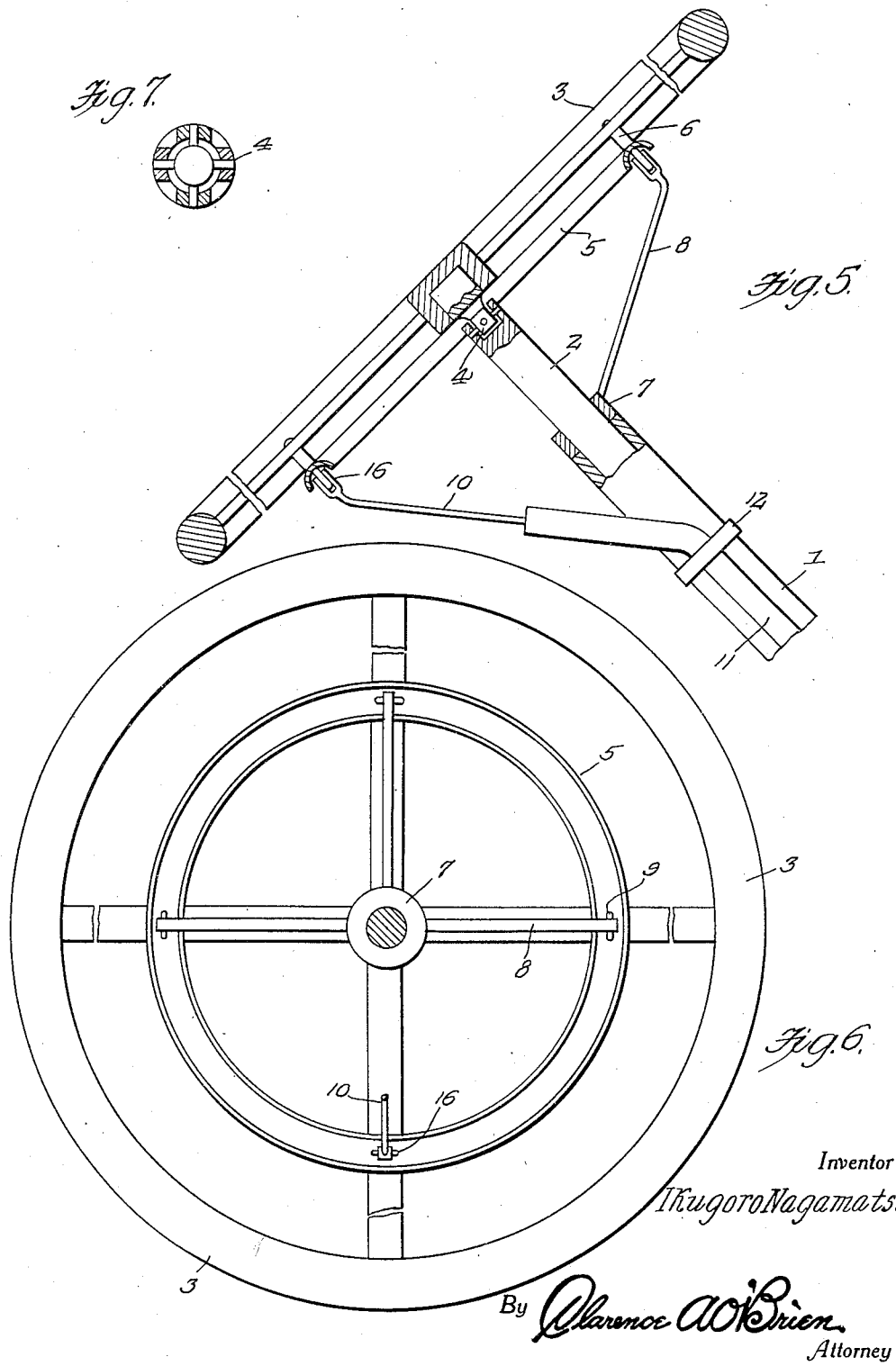

1,870,525

UNITED STATES PATENT OFFICE

IKUGORO NAGAMATSU, OF LAS VEGAS, NEVADA

STEERING WHEEL BRAKE

Application filed September 22, 1931. Serial No. 564,407.

This invention relates to means for operating the brake of a motor vehicle by the steering wheel, the general object of the invention being to provide means whereby the steering wheel can be tilted with means for depressing the brake pedal by the tilting movement of the steering wheel.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side view of parts of a motor vehicle showing the invention in use.

Figure 2 is a section on line 2—2 of Figure 1.

Figure 3 is a view of the outturned member for supporting the wheel when in normal position.

Figure 4 is a view partly in section showing the connection between the brake pedal and the push rod.

Figure 5 is a sectional view through the steering wheel and parts of the steering column.

Figure 6 is a bottom plan view of the steering wheel and the parts oscociated therewith.

Figure 7 is a sectional view through the universal joint which connects the shaft wheel to the steering shaft.

Figure 8 is a sectional view of a part of the brake push rod and its enclosing tube.

In these drawings, the numeral 1 indicates a steering column and the numeral 2 the steering shaft to which the steering wheel 3 is connected by the universal joint 4 so that the steering wheel has tilting movement on the shaft. A rim 5 of much smaller diameter than the rim or the steering wheel is connected to the under part of the wheel by the spacers and bolts shown generally at 6. A collar 7 is suitably connected to the upper end of the steering column and surrounds the shaft and said collar has three arms 8 radiating therefrom. Each arm has its outer end bent upwardly and carrying a small roller 9 for engaging the rim 5. These arms are so arranged that the lower part of the steering wheel can be pushed downwardly to tilt the wheel on the joint 4 but said arms prevent tilting movement of the wheel in any other direction. A rod 10 is slidably supported in a tubing 11 attached to the steering column by the clamping bands 12 and the lower end of the rod is bent and is connected to a rod 13 by a joint 14 and said rod 13 is connected to the brake pedal 15.

The upper end of the rod 10 serves as a roller 16 which contacts the lower part of the rim 5 so that when the steering wheel has its lower part tilted the rod 10 will be pushed downwardly and this movement is communicated to the bar 13 so that the brake pedal 15 is depressed and the brake applied. When the steering wheel is partly released or the pressure removed from its lower part, the spring attached to the brake pedal will return the parts to normal position and if desired the spring may be located in the housing 11 to help the brake pedal spring remove the rod 10 and parts attached thereto to normal position.

From the foregoing it will be seen that I have provided means whereby a downward movement of that part of the steering wheel next to the driver will cause a depression of the brake pedal to apply the brake.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. In combination with a brake pedal and steering column and steering shaft of a motor vehicle, a steering wheel, a universal joint connecting the hub of the wheel with the upper end of the shaft, means for supporting the wheel against tilting movement except in one direction and means whereby the tilting movement of the wheel will depress the brake pedal.

2. In combination with a brake pedal the steering column and shaft and steering wheel of a motor vehicle, a universal joint connecting the hub of the wheel with the upper end of the shaft, a rim attached to a lower part of the wheel, a collar attached to the upper end of the column and having radiating arms thereon, rollers on the arms engaging the rim, said rollers and arms preventing tilting movement of the wheel except at that point at the lower part of the wheel, guiding means attached to the column, a rod slidably supported to said means and having a roller at its upper end engaging the rim and means for connecting the lower end of the rod to the brake pedal whereby a tilting movement of the wheel will depress the pedal.

3. In combination with a brake applying member and steering column and steering shaft of a motor vehicle, a steering wheel, a universal joint connecting the hub of the wheel with the upper end of the shaft, means for supporting the wheel against tilting movement except in one direction and means whereby the tilting movement of the wheel will operate said brake member.

In testimony whereof I affix my signature.

IKUGORO NAGAMATSU.